(12) United States Patent
Hebron et al.

(10) Patent No.: US 9,813,999 B2
(45) Date of Patent: Nov. 7, 2017

(54) METHOD AND APPARATUS FOR DETERMINING MOCA BEACON TRANSMIT POWER

(71) Applicant: MaxLinear, Inc., Carlsbad, CA (US)

(72) Inventors: Yoav Hebron, San Diego, CA (US); Na Chen, San Diego, CA (US); Ronald Lee, San Diego, CA (US)

(73) Assignee: MAXLINEAR, INC., Carlsbad, CA (US)

(*) Notice: Subject to any disclaimer, the term of this patent is extended or adjusted under 35 U.S.C. 154(b) by 97 days.

(21) Appl. No.: 14/824,973

(22) Filed: Aug. 12, 2015

(65) Prior Publication Data

US 2016/0050110 A1    Feb. 18, 2016

Related U.S. Application Data (60) Provisional application No. 62/036,496, filed on Aug. 12, 2014.

(51) Int. Cl.
*H04W 52/32* (2009.01)
*H04W 52/40* (2009.01)

(52) U.S. Cl.
CPC .......... *H04W 52/32* (2013.01); *H04W 52/322* (2013.01); *H04W 52/325* (2013.01); *H04W 52/40* (2013.01)

(58) Field of Classification Search
None
See application file for complete search history.

(56) References Cited

U.S. PATENT DOCUMENTS

| | | | | |
|---|---|---|---|---|
| 7,430,433 B2* | 9/2008 | Choi | .................. | H04W 52/265 370/318 |
| 8,509,173 B2* | 8/2013 | Kim | .................. | H04W 52/243 370/329 |
| 8,724,485 B2* | 5/2014 | Kliger | ................ | H04L 12/2803 370/252 |
| 8,909,945 B2* | 12/2014 | Rudolf | ................ | H04W 52/46 370/318 |
| 2007/0042784 A1* | 2/2007 | Anderson | ............ | H04W 52/34 455/450 |
| 2010/0011231 A1* | 1/2010 | Banerjea | ........... | H04W 52/0251 713/320 |
| 2013/0157706 A1* | 6/2013 | Jo | ........................ | H04W 16/14 455/512 |
| 2014/0003361 A1* | 1/2014 | Song | .................... | H04W 16/14 370/329 |
| 2015/0098378 A1* | 4/2015 | Dore | .................... | H04W 24/02 370/311 |
| 2015/0382306 A1* | 12/2015 | Lee | ..................... | H04W 52/243 455/501 |
| 2016/0227489 A1* | 8/2016 | Oteri | ................ | H04W 74/0808 |

* cited by examiner

*Primary Examiner* — Steven H Nguyen
(74) *Attorney, Agent, or Firm* — McAndrews, Held & Malloy, Ltd.

(57) ABSTRACT

Systems and methods for efficiently establishing beacon transmission power, for example in networks in which beacon transmission responsibility can be passed between nodes. As a non-limiting example, various aspects of the present disclosure provide systems and methods for establishing beacon transmission power in a node that has received beacon transmission responsibility in a network, for example by hand-off, failover, etc.

24 Claims, 4 Drawing Sheets

METHOD AND APPARATUS FOR DETERMINING MOCA BEACON TRANSMIT POWER

CROSS-REFERENCE TO RELATED APPLICATIONS/INCORPORATION BY REFERENCE

This patent application makes reference to, claims priority to and claims benefit from U.S. Provisional Patent Application Ser. No. 62/036,489, filed on Aug. 12, 2014, and titled "Method and Apparatus for Determining MoCA Beacon Transmit Power," the entire contents of which are hereby incorporated herein by reference.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND

Various communication networks, for example in networks in which beacon transmission responsibility can be passed between nodes, lack a method and/or apparatus for efficiently establishing beacon transmission power. Limitations and disadvantages of conventional methods and systems for establishing beacon transmission power will become apparent to one of skill in the art, through comparison of such approaches with some aspects of the present methods and systems set forth in the remainder of this disclosure with reference to the drawings.

SUMMARY

Various aspects of this disclosure provide systems and methods for efficiently establishing beacon transmission power, for example in networks in which beacon transmission responsibility can be passed between nodes. As a non-limiting example, various aspects of the present disclosure provide systems and methods for establishing beacon transmission power in a node that has received beacon transmission responsibility in a network, for example by hand-off, failover, etc.

DETAILED DESCRIPTION OF VARIOUS ASPECTS OF THE DISCLOSURE

As utilized herein the terms "circuits" and "circuitry" refer to physical electronic components (i.e., hardware) and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code.

As utilized herein, circuitry is "operable" to perform a function whenever the circuitry comprises the necessary hardware and code (if any is necessary) to perform the function, regardless of whether performance of the function is disabled, or not enabled (e.g., by a user-configurable setting, factory setting or trim, etc.).

As utilized herein, "and/or" means any one or more of the items in the list joined by "and/or". As an example, "x and/or y" means any element of the three-element set {(x), (y), (x, y)}. That is, "x and/or y" means "one or both of x and y." As another example, "x, y, and/or z" means any element of the seven-element set {(x), (y), (z), (x, y), (x, z), (y, z), (x, y, z)}. That is, "x, y, and/or x" means "one or more of x, y, and z." As utilized herein, the terms "e.g.," and "for example" set off lists of one or more non-limiting examples, instances, or illustrations.

The terminology used herein is for the purpose of describing particular examples only and is not intended to be limiting of the disclosure. As used herein, the singular forms are intended to include the plural forms as well, unless the context clearly indicates otherwise. It will be further understood that the terms "comprises," "includes," "comprising," "including," "has," "have," "having," and the like when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present disclosure. Similarly, various spatial terms, such as "upper," "lower," "side," and the like, may be used in distinguishing one element from another element in a relative manner. It should be understood, however, that components may be oriented in different manners, for example a semiconductor device may be turned sideways so that its "top" surface is facing horizontally and its "side" surface is facing vertically, without departing from the teachings of the present disclosure.

A premises (e.g., a home, office, campus, etc.) may comprise a communication network for the sharing of information between various devices within the premises. For example, entertainment content may be received through a wide area network (WAN) provided by an MSO (Multi-system Operator), such as a cable television operator or satellite content provider. Content provided to the premises may be distributed throughout the premises over a premises-based network (e.g., a home entertainment network, general premises-based communication network, etc.). The premises-based network may, for example, comprise a local area network (LAN) in any of a variety of configurations, such as a mesh network. An example protocol for establishing a premises-based network, for example a home entertainment LAN, is defined by the well-known MoCA (Multi-media over Coax Alliance) network protocol that is in-use today.

Figure 1:
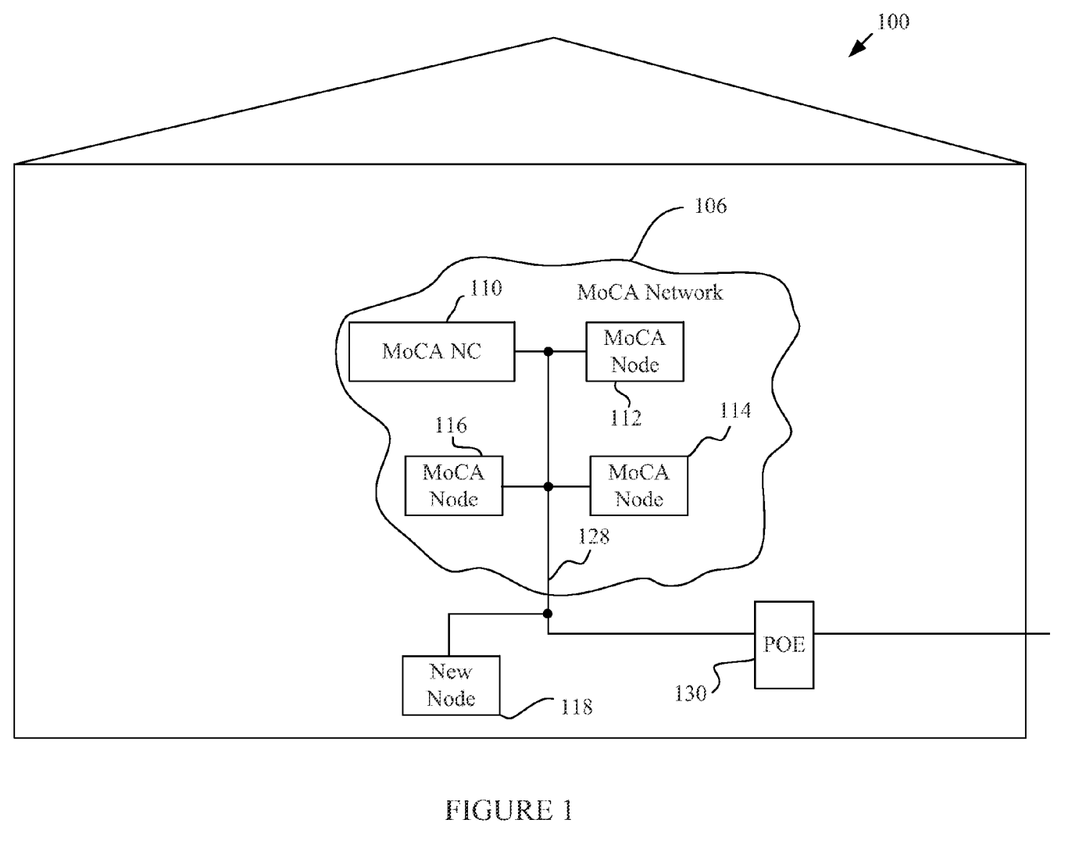
FIG. 1 is a simplified illustration of an example home comprising a MoCA network and nodes.

FIG. 1 is a simplified illustration of an example home 100 comprising a MoCA network 106 and nodes 110, 112, 114, and 116. Though only four nodes are illustrated it should be understood that the network 106 may comprise any number of nodes. The nodes of the network 106 are coupled to a coaxial cable medium 128. In the example network 106, the signals present on the coaxial cables of the network 106 are available to each of the nodes 110, 112, 114, and 116. A point of entry (POE) device 130 allows selected information from outside the home to be coupled to the coaxial medium 128 while preventing information that is intended to remain within the network 106 from flowing out. Though much of the discussion herein presents examples of various aspects of the disclosure in the context of a MoCA network, it would be understood that the scope of this disclosure is not limited to a MoCA network nor by various characteristics of a MoCA network.

The example network 106, for example a MoCA network, may be formed by each node, upon connecting to the medium 128, searching for another node to determine whether a network already exists. A New Node (NN) 118 searches by attempting to detect the transmission of a Beacon message. A Beacon message may, for example, comprise an unencrypted transmission sent by a node 110 operating as Network Coordinator (NC) (or network controller). The NC 110 may, for example, be responsible for scheduling all of the activity on the network 106 over the coaxial medium 128. All activity on the network may, for example, be scheduled by the NC 110 transmitting a Media Access Plan (MAP) message. In one example implementation, there is always one, and only one, NC 110 on the network 106 at a time. In an example implementation, any node of the network 106 (e.g., a MoCA network) can assume responsibility for functioning as the NC. If there is no other network yet formed on the medium 128, the node 110 will take on the responsibility for functioning as the NC and admit other nodes to form a network.

As other nodes are installed, they will each detect the Beacons being transmitted by this first node acting as the NC 110. When an NN 118 detects the Beacons, the NN 118 will go through an admission process whereby the NN 118 will gain admission to the network 106 established by the NC 110. At times, if the NC 110 ceases functioning correctly, hands off NC responsibility, or is removed from the network, responsibility for performing the functions of the NC will be taken up by another node (e.g., node 112) in the network 106.

In an example implementation, the NC 110 may for example establish the amount of power with which to transmit the Beacon signals over the coaxial medium 128 by reading a control parameter that determines a "back-off" value. The power to be used is specified as the maximum power minus the back-off (e.g., a specific amount of attenuation from the maximum power level). It should be understood, though, that the NC 110 may determine a transmission power in any of a variety of manners, and that the scope of the present disclosure is not limited by characteristics of any particular manner.

When an NC 110 is removed from service or hands off the NC role (or responsibilities), a procedure is implemented to smoothly transition the NC responsibilities to another node. At a transition point, the new NC 112 will then start to transmit the Beacons. In an example implementation, the new NC 112 may read a control parameter associated with that node and determine the back-off value to be used by the NC 112 in transmitting the Beacons. The new NC 112 will then transmit the Beacon at maximum power minus the back-off specified by the control parameter maintained by the new NC 112. In this example, however, a problem may arise, in that the maximum power of the new NC 112 might not be the same as the maximum power of the previous NC 110. Therefore, it is not always desirable for the new NC 112 to assume the same back-off that the previous NC 110 used when transmitting the Beacons. In addition, the new NC 112 may use a different back-off control parameter than the control parameter used by the previous NC.

Accordingly, various aspects of the present disclosure provide systems, methods, and/or protocols that can establish the Beacon transmit power for a new network coordinator (NC) node quickly and effectively such that the Beacons will be transmitted by the new NC node at essentially the same power as they were being transmitted by the previous network coordinator.

Various aspects of the present disclosure provide systems and methods that allow a node that is to take over the role of Network Coordinator (NC) to determine the amount of power with which to transmit Beacons over the network. Several example control parameters are presented herein that control the process for setting the Beacon transmission power. An example Beacon Power Protocol Information Element (PIE) is also presented herein, which provides for information regarding the values of these example control parameters to be shared and sent properly through the network. In accordance with one example implementation, a hierarchy is established for determining the amount of power that an NC is to use for transmitting Beacons over the network.

In one example implementation, a node may maintain a local variable, for example named "Target Beacon Power." A first example control parameter BEACON_PWR$_{CFG\_ONLY}$ may, for example, indicate whether an NC is to set its Target Beacon Power to a level determined by a second control parameter BEACON_PWR$_{TX}$. In accordance with one example implementation, if the value of the control parameter BEACON_PWR$_{CFG\_ONLY}$ is ENABLED, then the NC sets the value of the local variable Target Beacon Power to the value indicated by the control parameter BEACON_PWR$_{TX}$.

Continuing the example, if the value of the control parameter BEACON_PWR$_{CFG\_ONLY}$ is DISABLED, then the node checks whether a Beacon Power PIE has been received since the node joined the network. If so, the node will set the value of the local variable Target Beacon Power to a value sent in the BEACON_TRANSMIT_POWER field of the received Beacon Power PIE. If the node has not received a Beacon Power PIE since joining the network, but had received a Beacon Power PIE before joining the network, then the node will check whether the value in a BEACON_POWER_PERSISTENCY field within the Beacon Power PIE was set to a predetermined value. If so, then the node will set the Target Beacon Power to the value indicated in the BEACON_TRANSMIT_POWER field of the Beacon Power PIE previously received. Otherwise, the node will set the value of the variable Target Beacon Power to the value of the control parameter BEACON_PWR$_{TX}$.

In addition, a control parameter BEACON_PWR$_{DIST}$ is presented that specifies whether an NC is to send a Beacon Power PIE. If the control parameter BEACON_PWR$_{DIST}$ has a value of ENABLE, then the NC sends the Beacon Power PIE following any of at least three example events. A first example event is when a New Node completes admission. A second example event is when a node becomes an NC after NC handoff or failover. A third example event is when the variable Target Beacon Power changes due to a new BEACON_PWR$_{TX}$ setting. Note that the scope of this disclosure is not limited by characteristics of particular example events.

Further, an example control parameter HANDOFF_TO_LOWER_VER$_{EN}$ is presented herein, which restricts the ability of a node to assume and/or handover the role of NC for the network.

Figure 2:
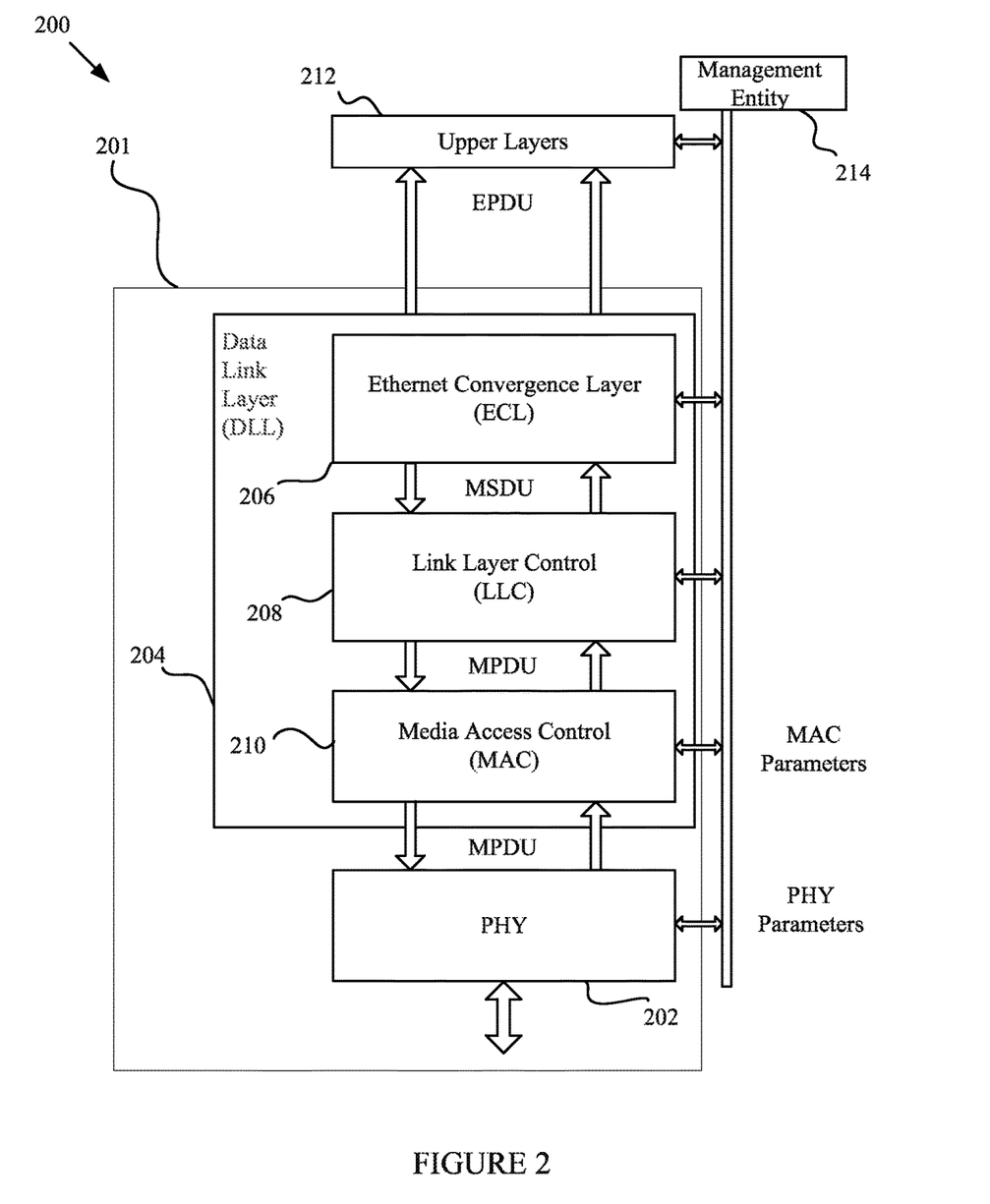
FIG. 2 is a logical block diagram of a network node in accordance with various aspects of the present disclosure.

FIG. 2 is a logical block diagram 200 of a network node 201 in accordance with various aspects of the present disclosure. The network node 201 may, for example, be operable to perform any or all of the node functionality discussed herein (e.g., for a new node 118, network coordinator node 110, existing node 112, 114, and 116, any or all of the nodes discussed herein, etc.). In general, each node discussed herein may be functioning in a manner that is appropriate to the role such node is currently performing. For example, in the scenario illustrated in FIG. 1 and discussed herein, the NC node 110 performs the role of the network NC, the node 118 plays the role of an NN that has not yet been admitted to the network 106, the Existing Nodes (EN) 112, 114, and 116 play the role of a node that has been admitted to the network 106 by the NC 110, etc. In various example scenarios discussed herein, the EN 112 may also play the roll of a node that is in the process of taking over NC functionality from the NC node 110. Various functions of the network nodes are disclosed herein in order to understand how each node functions in its role in accordance with various aspects of the present disclosure.

The example node 201 uses the seven layer Open System Interconnection (OSI) model and/or any generally analogous layered communication model. For example, the node 201 may comprise circuitry that operates to implement a physical layer 202 which is responsible for controlling the physical interface to the medium (e.g., cable medium, phone line medium, other wired medium, wireless medium, tethered and/or untethered optical medium, etc.), including transmitting and/or receiving signals over the medium.

The node 201 may comprise circuitry that operates to implement a Data Link Layer (DLL) 204, for example comprising several sub-layers (e.g., an Ethernet Convergence Layer (ECL) 206, Link Layer Control (LLC) 208, Media Access Control (MAC) 210, etc.). The DLL 204 may, for example, be responsible for controlling the higher layer operation above the physical layer and determining the timing and management of messages to be transmitted and received. Accordingly, the DLL 204 may work with the physical layer 202 to perform any or all of the functions discussed herein (e.g., with regard to FIGS. 1-4). In one example implementation, the DLL 204 is implemented by the execution of software running on at least one processor. The DLL 204 and/or any of the layers shown in FIG. 2 may be implemented by any of a variety of types of processing circuitry (e.g., application-specific integrated circuitry, programmable array logic circuitry, discrete logic circuitry, general-purpose processor circuitry, specific-purpose processing circuitry, etc.).

In accordance with various aspects of the present disclosure, a Management Entity (ME) 214 may, for example, comprise a high layer logical device associated with the node 201. The ME 214 or portions thereof may, for example, be collocated with the node 201 and/or may be implemented at a location that is geographically remote from the node 201. The ME 214, for example, uses the node 201 to send and receive information over the network.

Figure 3:
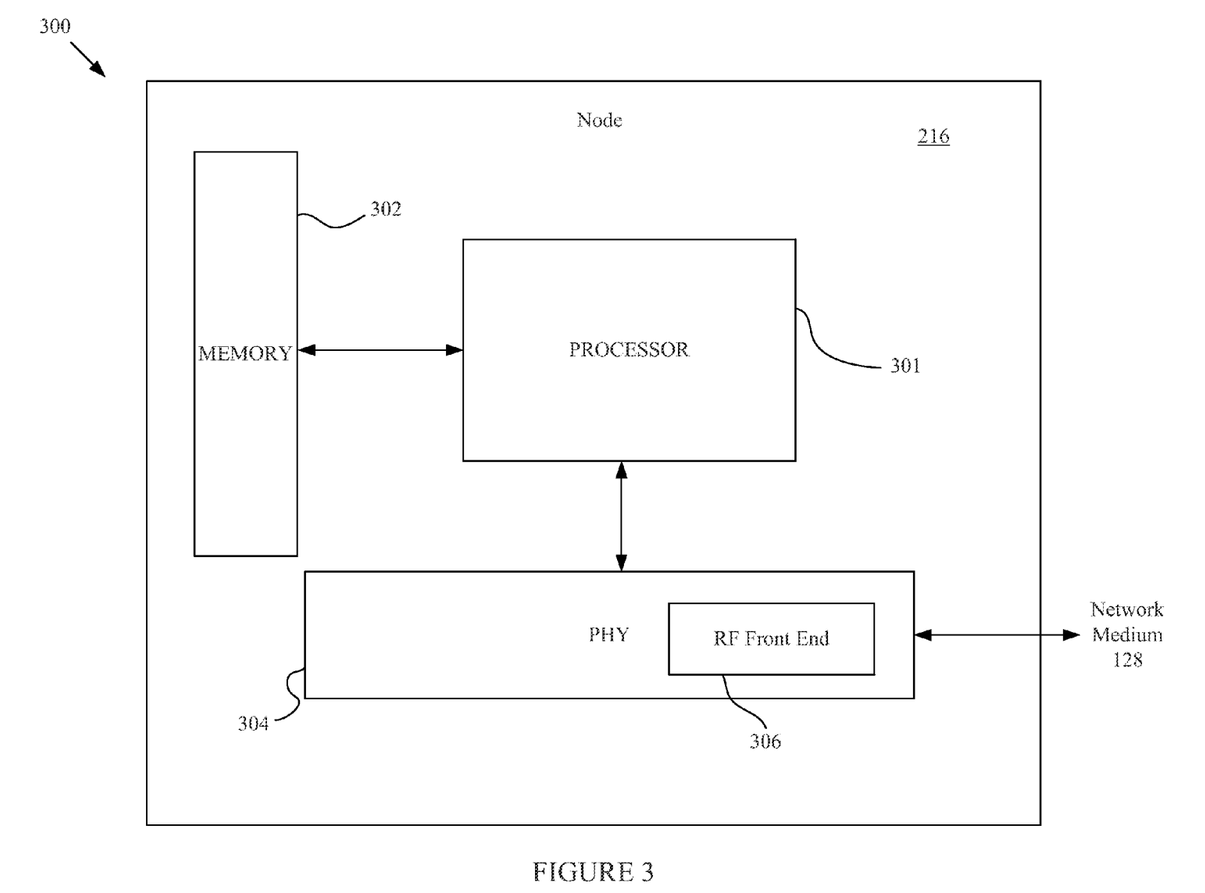
FIG. 3 is a simplified block diagram of example circuitry used to implement a network node, in accordance with various aspects of the present disclosure

FIG. 3 is a simplified block diagram of example circuitry used to implement a network node 300, in accordance with various aspects of the present disclosure. The network node 300 may, for example, be operable to perform any or all of the node functionality discussed herein (e.g., with regard to FIGS. 1-4). The network node 300 may, for example, share any or all characteristics with any of the nodes discussed herein (e.g., the node 201 of FIG. 2, the nodes 110, 112, 114, 116, and 118 of FIG. 1, etc.).

The node 300 comprises at least one processor 301, a memory 302, and a PHY 304. The memory 302 is coupled to the processor 301. The PHY 304 includes an RF front end 306. The PHY 304 may also include a dedicated processor (not shown) that performs functions associated with the PHY 304. Alternatively, some control functions of the PHY 304 may be performed by the processor 301. In the transmit path, the PHY 304 and/or RF Front End 306 may receive information from the processor 301. The information is modulated on signals generated by the RF front end 306. The RF front end 306 transmits such signals over a medium 128 (e.g., over coaxial cabling used to connect notes of a MoCA network, etc.). In the receive path, the PHY 304 and/or RF front end 306 receive signals from the medium 128, demodulates the signals to retrieve the information communicated by such signals, and passes the received information to the processor 301 for processing. It should be understood that, while the example node 300 shown in FIG. 3 (and other nodes discussed herein) is described with respect to a node connected to a network via coaxial cable, the node 300 may be connected to the network over any medium.

The processor 301 within the node 300 performs several tasks. The example node 300 is shown and described as having a single processor 301 that performs all of the disclosed tasks and functions of the node 300. Nonetheless, it should be understood that the disclosed tasks and functions of the node 300 may be performed by any combination of hardware, firmware, and software. Furthermore, any software or firmware may be executed by one or a combination of several independent or coordinated processors. For example, in various example implementations, it may be more efficient to use processors dedicated to performing a particular task or group of tasks. Also for example, the processor 301 (or processors) may comprise any of a variety of processing circuits (e.g., general purpose processors, specific purposes processors, microcontrollers, application-specific integrated circuits, programmable state machine devices, analog and/or digital circuitry, etc.). In an alternative implementation, the node 300 may have several processors that work together or independently. The processor 301 may, for example, read computer readable program code from the memory 302 and execute the code to perform the functions of the DLL 204, the upper layers 212 and/or the ME 214 (see FIG. 2). In one example implementation, the ME 214 is not co-located with the DLL 204. In such an example implementation, the ME 214 may be implemented using a different processor or processors. Likewise, in one example implementation, the upper layers 212 are not co-located with the DLL 204. It should be understood that the particular physical layout of the logical components may vary substantially, so long as the disclosed functionality may be performed. In an alternative implementation, the functions of the DLL 204 and other functions disclosed herein may be performed by dedicated hardware, firmware or a combination of hardware, firmware and software executed by a special or general purpose processor.

In accordance with various aspects of the present disclosure, at least the following five example control parameters indicated in Table 1 are maintained in addition to other control parameters not noted herein and used by nodes of the network, for example operating in accordance any of a variety of network protocols (e.g., the MoCA protocol).

TABLE 1

Control Parameters Associated with Beacon Tx Power

| Parameter Name | Description | Values |
| --- | --- | --- |
| BEACON_PWR$_{CFG\_ONLY}$ | Controls whether the Node only uses the BEACON_PWR$_{TX}$ and ignores the Beacon transmit power distributed by the NC | ENABLED, DISABLED |
| BEACON_PWR$_{DIST}$ | Controls whether the Node distributes its BEACON_PWR$_{TX}$ to other Nodes when being the NC | ENABLED, DISABLED |
| BEACON_PWR$_{PERSISTENCY}$ | Controls whether other Nodes are required to persistently use the distributed Beacon transmit power and ignore its own managed parameter BEACON_PWR$_{TX}$ even after the transmitting node drops from the network | ENABLED, DISABLED |
| BEACON_PWR$_{TX}$ | The value of Beacon transmit power in units of dBm | Any integer in range of −10 to +7 |
| HANDOFF_TO_LOWER_VER$_{EN}$ | Controls whether handoff to a MoCA 2.0 or MoCA 1 node is enabled or disabled | ENABLED, DISABLED |

The first column of Table 1 indicates the name of the example control parameter. The second column provides a description of the example control parameter. The third column indicates permissible values for the example control parameter. It should be understood that the example control parameter names and example descriptions are merely examples, and thus the scope of this disclosure is not limited by such example control parameter names and/or example control parameter descriptions.

The first example control parameter in Table 1 is BEACON_PWR$_{CFG\_ONLY}$. The value of this example control parameter indicates whether a node 112, which for example is to become the NC, is to use only the value provided in the control parameter BEACON_PWR$_{TX}$ to determine the power level at which to transmit Beacons. If BEACON_PWR$_{CFG\_ONLY}$ carries a value of "ENABLE", then the node 112 will ignore all Beacon power information provided by the previous NC 110. In accordance with one example implementation, the node 112 transmits the Beacons at a level indicated by a local variable Target Beacon Power.

The second example control parameter is BEACON_PWR$_{DIST}$. The value of this example control parameter determines whether the node 110 distributes the value held in the local variable Target Beacon Power to other nodes 112, 114, 116 in the network 106 when operating as the NC. When the value of this control parameter is "ENABLE", the node 110 will distribute the value of Target Beacon Power to other nodes as discussed herein.

The third example control parameter is BEACON_PWR$_{PERSISTENCY}$. If the value of this example control parameter is "ENABLE", the node 110 requires that the other nodes 112, 114, 116 of the network 106 continue to use the Beacon transmit power value provided by the node 110, even for example after the node 110 ceases to function as the NC or leaves the network 106.

The fourth example control parameter is BEACON_PWR$_{TX}$. This example control parameter carries an integer value that indicates (e.g., in dBm) the power with which the node 110 is to transmit Beacons when the node 110 is operating as the NC. In accordance with one example implementation, the value of the control parameter BEACON_PWR$_{TX}$ is in a range between −10 dBm and +7 dBm.

The fifth example control parameter is HANDOFF_TO_LOWER_VER$_{EN}$. This example control parameter controls whether a handoff of the responsibility for performing the NC functions can be made to a node that operates in accordance with an older version of the network protocol. In accordance with one example implementation, this example control parameter is used to control whether the node 110 (e.g., operating in accordance with MoCA 2.1) can hand off responsibility for performing the functions of the NC to a MoCA 2.0 or MoCA 1 node.

In accordance with various aspects of the present disclosure, an example Information Element (IE) is provided in Table 2. The IE allows a node 110 that is operating as the NC for a network 106 to provide information to the other nodes 112, 114, 116 of the network 106. For example, the IE allows the node to indicate the power level to be used to transmit Beacons if one of the other nodes 112, 114, and 116 were to assume responsibility for operating as the NC.

TABLE 2

Beacon Power Protocol Information Element Format

| Field | Length | Usage |
|---|---|---|
| *Protocol IE Header* | | |
| FRAME_SUBTYPE | 4 bits | 0xC - Beacon Power IE |
| FRAME_TYPE | 4 bits | 0x7 - Protocol IE |
| IE_LENGTH | 6 bits | 0x00 |
| RESERVED | 2 bits | Type III |
| *Protocol IE Payload* | | |
| RESERVED | 10 bits | Type III |
| BEACON_POWER_PERSISTENCY | 1 bit | Indicates whether the NC enforces the other Nodes to persistently use the BEACON_TRANSMIT_POWER in this PIE for Beacon transmissions. The field MUST be set to 1 if BEACON_PWR$_{PERSISTENCY}$ = ENABLED and 0 if BEACON_PWR$_{PERSISTENCY}$ = DISABLED. |
| BEACON_TRANSMIT_POWER | 5 bits | Two's complement integer value of the Target Beacon Power in units of dBm. The Target Beacon Power is defined as Section 7.1.1 |

It should be understood that the example information element name, example field names and example field descriptions are merely examples, and thus the scope of this disclosure is not limited by such examples.

When a node (e.g., the network coordinator node 110, any other node discussed herein, etc.) determines that it is to take responsibility for performing the functions of the NC for the network 106, the node 110 must determine the power level at which to transmit Beacons. An example manner of making such a determination is provided at FIG. 4. It should be understood that the scope of this disclosure is not limited by any specific characteristics of the example method illustrated by FIG. 4, which merely provides examples of various aspects of the disclosure.

Figure 4:
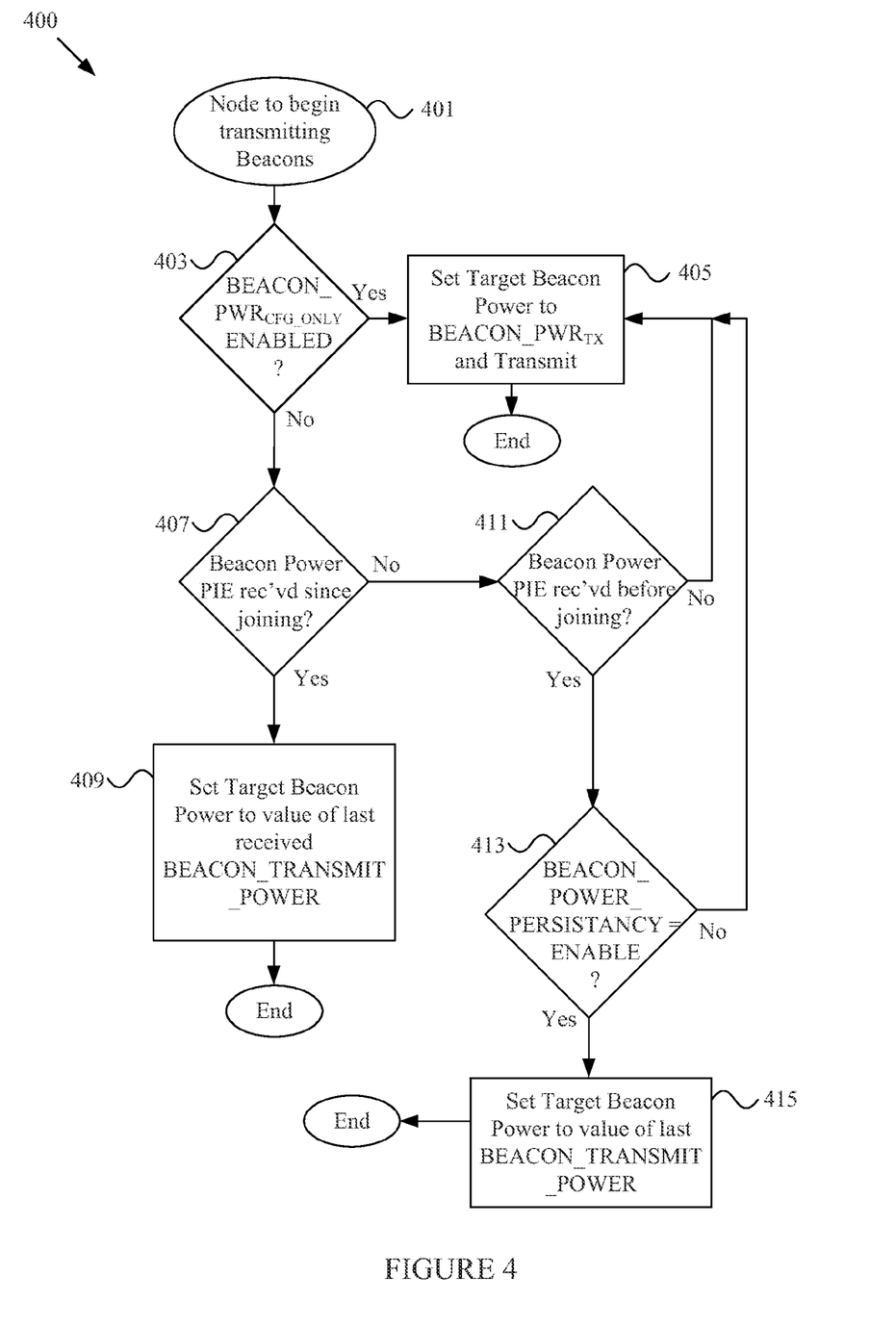
FIG. 4 is a flow diagram of an example method for determining beacon transmission power, in accordance with various aspects of the present disclosure.

FIG. 4 is a flow diagram of an example method 400 for determining beacon transmission power, in accordance with various aspects of the present disclosure. For example, a node (e.g., any of the nodes discussed herein) assuming and/or having a network coordinator role may operate in accordance with the example method 400, or any portion thereof, to determine the transmission power utilized for transmission of a Beacon. In an example implementation, a value of at least one local parameter of the node (e.g., Target Beacon Power) determines the power level at which the node 110 transmits Beacons.

In accordance with one example implementation, the example method 400 begins execution at block 401, at which a node begins to (or anticipates beginning to) transmit Beacons. For example, in one example implementation, a node 110 needs to transmit Beacons whenever it is operating as an NC.

At flow control block 403, the node 110 checks the status of the BEACON_PWR$_{CFG\_ONLY}$ control parameter. If the BEACON_PWR$_{CFG\_ONLY}$ is ENABLED, then the flow control block 403 directs execution of the example method 400 to block 405, at which the node 110 will set its Target Beacon Power to the value BEACON_PWR$_{TX}$ and begin transmitting beacons at the power level indicated by the Target Beacon Power. If, however, the BEACON_PWR$_{CFG\_ONLY}$ is not ENABLED, then the flow control block 403 directs execution flow of the example method 400 to block 407, at which the node 110 determines whether a Beacon Power Protocol IE (PIE) has been received since the node 110 joined the network 106.

If a Beacon Power PIE has been received since the node 110 joined the network 106, then the flow control block 407 directs execution flow of the example method 400 to block 409, at which the node 110 will set the Target Beacon Power to the value that was received in the BEACON_TRANSMIT_POWER field of the last received Beacon Power PIE. If, however, the node 110 has not received a Beacon Power PIE since joining the network 106, then the flow control block 407 directs execution flow of the example method 400 to block 411, at which the node 110 determines whether the node 110 had received a Beacon Power PIE prior to joining the network 106.

If the node 110 has received a Beacon Power PIE prior to joining the network 106, then the flow control block 411 directs execution flow of the example method 400 to block 413, at which the node 110 will check whether the BEACON_POWER_PERSISTENCY in its last received Beacon Power PIE was set to ENABLE. As noted in Table 2, such a value of ENABLE may, for example, indicates that the node from which the Beacon Power PIE was sent requires that all receiving nodes remain "persistent" (e.g., continue to use the value indicated in the BEACON_TRANSMIT_POWER field, even after the transmitting node leaves the network).

If persistence was enabled in the transmitting node, then the flow control block 413 will direct execution flow of the example method 400 to block 415, at which the receiving node 110 will set the Target Beacon Power to the value of the BEACON_TRANSMIT_POWER field of the last received Beacon Power PIE and transmit beacons at the Target Beacon Power level. If, however, persistence was not enabled in the transmitting node, then flow control block 413 will direct execution flow of the example method 400 to block 405, discussed above.

In one example implementation, either a user or a management entity 214 associated with an NC 110 can write a value to the example control parameter BEACON_POWER$_{TX}$. In accordance with one example implementation, when either the user or the management entity 214 changes the value of the Beacon transmit power, the NC 110 changes the Beacon transmit power in monotonic steps of 1 dB per Beacon until reaching the level indicated by the new value of BEACON_POWER$_{TX}$.

An NC 110 may transmit a Beacon Power PIE in response to any of a variety of causes or conditions, non-limiting examples are provided herein. For example, if the example control parameter BEACON_POWER$_{DIST}$ is set to ENABLE, and any of the following events occur, then the NC 110 must transmit a Beacon Power PIE:

The first example event occurs when a New Node (NN) 118 completes an admission to the network 106. In accordance with one example implementation, this can be determined by a change from "Begin PHY Profile State" to "Steady State" of the LINK_STATE_II in MAPs transmitted by the NC 110.

The second example event occurs when a node becomes an NC after NC handoff or "failover" (e.g., when it is determined that an NC 110 has failed and another node 112 is required to take over responsibility for the NC functions for the network 106).

The third example event occurs when the value of the Local Variable Target Beacon Power changes due to a new value for BEACON_PWR$_{TX}$.

In accordance with one example implementation, when any of these three events occur, the NC sends the Beacon Power PIE three different times. The first time, the Beacon Power PIE is sent in a first MAP message within Beacon cycles 1 to 3 following the event. The second time, the Beacon PIE is sent in a second MAP message within Beacon cycles 4 to 6 following the event. The third time, the Beacon PIE is sent in a third MAP message within Beacon cycles 7 to 9 following the event.

In accordance with one example implementation, in order to ensure that each node that might take on the responsibility of performing the NC functions for the network is capable of performing the desired NC functions, the control parameter HANDOFF_TO_LOWER_VER$_{EN}$ can be set to prevent a node that does not have the ability to perform the disclosed method from receiving an NC handoff.

In summary, various aspects of this disclosure provide systems and methods for efficiently establishing beacon transmission power, for example in networks in which beacon transmission responsibility can be passed between nodes. While the foregoing has been described with reference to certain aspects and examples, it will be understood by those skilled in the art that various changes may be made and equivalents may be substituted without departing from the scope of the disclosure. In addition, many modifications may be made to adapt a particular situation or material to the teachings of the disclosure without departing from its scope. Therefore, it is intended that the disclosure not be limited to the particular example(s) disclosed, but that the disclosure will include all examples falling within the scope of the appended claims.

The invention claimed is:

1. A network comprising:
a first network node; and
a network coordinator node, wherein:
the network coordinator node comprises at least one circuit operable to, at least:
analyze at least a first beacon power control parameter to determine whether to distribute a beacon power value to one or more other nodes of the network; and
if it is determined to distribute the beacon power value to one or more other nodes of the network, then at least:
populate a beacon power information element with information comprising the beacon power value; and
transmit the beacon power information element in a broadcast message; and
the first network node comprises at least one circuit operable to, at least:
analyze at least a second beacon power control parameter to determine whether to utilize the distributed beacon power value or a local beacon power value for transmission of a beacon;
if it is determined to utilize the distributed beacon power value for transmission of the beacon, then transmit the beacon with a transmission power that is in accordance with the distributed beacon power value; and
if it is determined to utilize the local beacon power value for transmission of the beacon, then transmit the beacon with a transmission power that is in accordance with the local beacon power value.

2. The network of claim 1, wherein the broadcast message is a Media Access Plan (MAP) message.

3. The network of claim 1, wherein the at least one circuit of the first network node is operable to store a plurality of control parameters in a memory, wherein:
the control parameters comprise the second beacon power control parameter; and
the second beacon power control parameter indicates whether the first network node is to transmit beacons in accordance with a power value that is distributed to network nodes.

4. The network node of claim 1, wherein the at least one circuit of the network coordinator node is operable to, when it is determined to transmit the beacon power information element in a broadcast message, always transmit the beacon power information element in a broadcast message at least three times, each in a different respective Media Access Control (MAP) message and in a different respective beacon cycle.

5. A network node comprising:
at least one circuit comprising a processor, memory, and communication medium interface circuitry, wherein the at least one circuit is operable to, at least:
analyze at least a first beacon power control parameter to determine whether to utilize a distributed beacon power value that is distributed by a network coordinator or to utilize a local beacon power value for transmission of a beacon;
if it is determined to utilize the distributed beacon power value for transmission of the beacon, then transmit the beacon with a transmission power that is in accordance with the distributed beacon power value; and
if it is determined to utilize the local beacon power value for transmission of the beacon, then transmit the beacon with a transmission power that is in accordance with the local beacon power value.

6. The network node of claim 5, wherein the at least one circuit is operable to set a second beacon power control parameter to the distributed beacon power value.

7. The network node of claim 5, wherein the at least one circuit is operable to receive the distributed beacon power value in a beacon power information element transmitted by a network coordinator node.

8. The network node of claim 5, wherein the at least one circuit is operable to receive the distributed beacon power value in a beacon power information element of a Media Access Plan (MAP) message transmitted by a network coordinator node, the beacon power information element comprising:

a header comprising a first field that identifies the beacon power information element as a beacon power information element; and a payload comprising a second field that comprises the distributed beacon power value.

9. The network node of claim 8, wherein the payload of the beacon power information element comprises a third field that identifies the distributed beacon power value as a network-wide beacon transmit power.

10. The network node of claim 5, wherein the at least one circuit is operable to store a plurality of control parameters in a memory, wherein:
the control parameters comprise the first beacon power control parameter; and
the first beacon power control parameter indicates whether the network node is to transmit beacons in accordance with a power value that is distributed to network nodes.

11. The network node of claim 5, wherein the at least one circuit is operable to store a plurality of control parameters in a memory, the control parameters comprising a second beacon power control parameter that indicates a target beacon transmission power.

12. The network node of claim 11, wherein the second beacon power control parameter is settable by a management entity logically associated with the network node and/or a user.

13. The network node of claim 12, wherein the at least one circuit is operable to, in response to a change in the second beacon power control parameter, change beacon transmission power monotonically in steps of 1 dB per beacon.

14. The network node of claim 5, wherein the at least one circuit is operable to store a plurality of control parameters in a memory, the control parameters comprising a beacon power distribution control parameter that indicates whether the network node is to distribute its beacon transmission power level to other nodes.

15. The network node of claim 5, wherein the at least one circuit is operable to store a plurality of control parameters in a memory, the control parameters comprising a handoff control parameter that indicates whether the network node may hand off network coordinator functionality to another node operating in accordance with an earlier version of a standard that the network node is operating in accordance with.

16. A network node comprising:
at least one circuit comprising a processor, memory, and communication medium interface circuitry, wherein the at least one circuit is operable to, at least:
analyze at least a first beacon power control parameter to determine whether to control beacon transmission power of one or more other nodes of a network; and
if it is determined to control the beacon transmission power of the one or more other nodes of the network, then at least:
populate a beacon power information element with information comprising a beacon power value; and
transmit the beacon power information element in a broadcast message.

17. The network node of claim 16, wherein the network node is a network coordinator node of a premises-based coaxial cable communication network.

18. The network node of claim 16, wherein the broadcast message is a Media Access Plan (MAP) message comprising medium access schedule information.

19. The network node of claim 16, wherein the at least one circuit is operable to, when it is determined to transmit the beacon power information element in a broadcast message, always transmit the beacon power information element in a broadcast message at least three times, each in a different respective Media Access Control (MAP) message.

20. The network node of claim 16, wherein the at least one circuit is operable to, when it is determined to transmit the beacon power information element in a broadcast message, always transmit the beacon power information element in a broadcast message at least three times, each in a different respective beacon cycle.

21. The network node of claim 16, wherein the at least one circuit is operable to determine whether to control beacon transmission power of one or more other nodes of the network based, at least in part, on a determination that a new node has completed admission to the network and on a beacon power control parameter independent of present communication medium conditions, that indicates the beacon power value is to be distributed.

22. The network node of claim 16, wherein the at least one circuit is operable to determine whether to control beacon transmission power of one or more other nodes of the network based, at least in part, on a determination that another node is taking over network coordinator operation for the network and on a beacon power control parameter, independent of present communication medium conditions, that indicates the beacon power value is to be distributed.

23. The network node of claim 16, wherein the at least one circuit is operable to determine whether to control beacon transmission power of one or more other nodes of the network based, at least in part, on a beacon transmit power control parameter of the network node being modified, and on a beacon power control parameter, independent of present communication medium conditions, that indicates the beacon power value is to be distributed.

24. The network node of claim 16, wherein the at least one circuit is operable to determine whether to control beacon transmission power of one or more other nodes of the network based, at least in part, on a beacon transmit power control parameter, independent of present communication medium conditions, of the network node being modified by a management entity logically associated with the network node.

* * * * *